(12) United States Patent
Yan

(10) Patent No.: US 8,680,210 B2
(45) Date of Patent: Mar. 25, 2014

(54) METHOD FOR MAKING FUNCTIONALIZED POLYMER

(75) Inventor: Yuan-Yong Yan, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/462,221

(22) Filed: May 2, 2012

(65) Prior Publication Data

US 2012/0283387 A1　　Nov. 8, 2012

Related U.S. Application Data

(60) Provisional application No. 61/481,313, filed on May 2, 2011.

(51) Int. Cl.
　　*C08C 19/25*　　(2006.01)
(52) U.S. Cl.
　　USPC ........ 525/342; 526/335; 526/340; 526/340.4; 526/346; 526/347
(58) Field of Classification Search
　　None
　　See application file for complete search history.

(56) References Cited

U.S. PATENT DOCUMENTS

| | | | |
|---|---|---|---|
| 3,244,664 A | 4/1966 | Uraneck et al. | |
| 4,618,650 A | 10/1986 | Halasa et al. | |
| 4,788,309 A | 11/1988 | Laine et al. | |
| 4,992,523 A | 2/1991 | Bacque et al. | |
| 5,008,422 A | 4/1991 | Blum et al. | |
| 5,086,126 A | 2/1992 | Mahone | |
| 5,561,210 A | 10/1996 | Roy | |
| 5,652,310 A | 7/1997 | Hsu et al. | |
| 5,811,479 A | 9/1998 | Labauze | |
| 5,929,149 A | 7/1999 | Matsuo et al. | |
| 5,932,649 A * | 8/1999 | Hergenrother et al. | 524/588 |
| 6,013,718 A | 1/2000 | Cabioch et al. | |
| 6,020,430 A | 2/2000 | Letchford et al. | |
| 6,071,995 A | 6/2000 | Labauze | |
| 6,329,487 B1 | 12/2001 | Abel et al. | |
| 6,558,805 B2 | 5/2003 | Khadir et al. | |
| 6,624,256 B2 * | 9/2003 | Kwag et al. | 525/342 |
| 6,667,362 B2 | 12/2003 | Robert et al. | |
| 6,706,804 B2 | 3/2004 | Resendes | |
| 6,846,873 B2 | 1/2005 | Choi et al. | |
| 6,900,263 B2 | 5/2005 | Hodge | |
| 6,908,877 B2 | 6/2005 | Shin et al. | |
| 7,151,140 B2 | 12/2006 | Choi et al. | |
| 7,491,786 B2 | 2/2009 | Prasse et al. | |
| 7,504,457 B2 | 3/2009 | Harwood et al. | |
| 7,507,849 B2 | 3/2009 | Benson et al. | |
| 7,612,147 B2 | 11/2009 | Halasa et al. | |
| 7,767,774 B2 | 8/2010 | Ozawa et al. | |
| 7,790,829 B2 | 9/2010 | Srikanth et al. | |
| 7,943,120 B2 | 5/2011 | Ichinohe et al. | |
| 8,063,153 B2 | 11/2011 | Lawson et al. | |
| 8,410,224 B2 | 4/2013 | Matsumoto et al. | |
| 8,470,706 B2 | 6/2013 | Arnold et al. | |
| 2004/0023926 A1 | 2/2004 | Guennouni et al. | |
| 2004/0127645 A1 | 7/2004 | Baik et al. | |
| 2005/0288408 A1 | 12/2005 | Brain et al. | |
| 2007/0255029 A1 * | 11/2007 | Robert | 526/153 |
| 2008/0255317 A1 | 10/2008 | Bachmaier et al. | |
| 2009/0143525 A1 | 6/2009 | Ashiura et al. | |
| 2010/0016500 A1 | 1/2010 | Masaki et al. | |
| 2010/0248947 A1 * | 9/2010 | Thiele | 502/154 |

FOREIGN PATENT DOCUMENTS

| | | | |
|---|---|---|---|
| JP | 09-216948 | * | 8/1997 |
| WO | 2012092595 A2 | | 7/2012 |

OTHER PUBLICATIONS

"First In-Situ Observation of Psueodliving Character and Active Site of Nd-Based Catalyst for 1,3-Butadiene Polymerization Using Snychrotron X-Ray Absorption and UV-Visible Spectroscopies".*
U.S. appl. No. 13/562,226 (Yan), mailed Jul. 15, 2013 (1 pg.).

* cited by examiner

*Primary Examiner* — Marc Zimmer
(74) *Attorney, Agent, or Firm* — Meredith E. Hooker; David G. Burleson

(57) ABSTRACT

A macromolecule includes at least one polymer chain and terminal functionality. The terminal functionality includes a ring-opened radical of a cyclosilazane or cyclic hydrosiloxane. The polymer can include unsaturated mer units and can be provided via anionic polymerization techniques. The macromolecule can be used as a component of a composition that also includes particulate fillers, with the composition being useful for the production of vulcanizates.

20 Claims, No Drawings

METHOD FOR MAKING FUNCTIONALIZED POLYMER

CROSS-REFERENCE TO RELATED APPLICATION

This application claims the benefit of U.S. provisional patent appl. No. 61/481,313, filed May 2, 2011, the entire disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of these properties. Ensuring that reinforcing filler(s) are well dispersed throughout the elastomeric material(s) both enhances processability and acts to improve physical properties. Dispersion of fillers can be improved by increasing their interaction with the elastomer(s). Examples of efforts of this type include high temperature mixing in the presence of selectively reactive promoters, surface oxidation of compounding materials, and surface grafting.

The section of a polymer chain from the site of the last crosslink to an end of the polymer chain is a major source of hysteretic losses; this free end is not tied to the macro-molecular network and thus cannot be involved in an efficient elastic recovery process and, as a result, energy transmitted to this section of the polymer (and vulcanizate in which such polymer is incorporated) is lost as heat. Ensuring that these polymer chain ends are tied to, or otherwise interact well with, reinforcing particulate fillers, is important to many vulcanizate physical properties such as, for example, reduced hysteresis. Chemically modifying the polymer, typically at a terminus thereof, is one of the most effective ways of increasing interactivity of fillers and polymers.

Certain tests have come to be recognized as correlating certain physical properties of vulcanizates with performance of products, particularly tire treads, made therefrom. For example, reductions in hysteresis (heat build-up during operation) have been found to correlate with higher rebound values and lower loss tangent values (tan δ) at high temperature, better handling performance often correlates with higher elastic modulus values at high temperature and strain, ice traction has been found to correlate with lower modulus values at low temperatures, etc. (In the foregoing, "high temperature" typically is considered to be about 50°-65° C. while "low temperature" is considered to be about 0° to −25° C.)

Various elastomeric materials often are used in the manufacture of vulcanizates such as, e.g., tire components. In addition to natural rubber, some of the most commonly employed include high-cis polybutadiene, often made by processes employing catalysts, and substantially random styrene/butadiene interpolymers, often made by processes employing anionic initiators. Functionalities that can be incorporated into high-cis polybutadiene often cannot be incorporated into anionically initiated styrene/butadiene interpolymers and vice versa.

SUMMARY

In one aspect is provided a method for providing a polymer having terminal functionality which includes multiple repeating units in which a silicon atom is bonded to an oxygen, sulfur or nitrogen atom. The method involves reacting a terminally active polymer with a cyclic compound having one of the following formulas

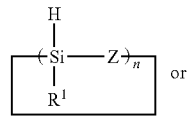  (Ia)

or

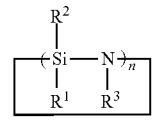  (Ib)

where n is 3 or 4, Z is an O or S atom, $R^1$ is a substituted or unsubstituted hydrocarbyl group, and one of $R^2$ and $R^3$ is a hydrogen atom and the other is a hydrocarbyl group. (Where $R^3$ is H, $R^2$ also can be a substituted hydrocarbyl group.) A silicon atom of the compound is believed to react with a C atom at a chain terminus so as to result in attachment of a ring-opened version of the compound to a terminus of the polymer.

The still-living terminally functionalized polymer provided by the foregoing method can be reacted with coupling or blocking agents or can be terminated.

In another aspect is provided a macromolecule that includes at least one polymer chain which includes unsaturated mer units and terminal functionality. The terminal functionality includes three or four repeat units resulting from the opening of the ring of the cyclic compound.

In each of the foregoing, some or all of the polymer chains preferably includes polyene mer units. In certain embodiments, the polyenes can be conjugated dienes, and the resulting conjugated diene mer can be incorporated substantially randomly along the polymer chain.

In each aspect, the polymer can be substantially linear. The substantially linear polymer can include as a terminal moiety the radical of a formula Ia or Ib compound.

The functionalized polymer can interact with particulate filler such as, e.g., carbon black and silica. Compositions, including vulcanizates, that include particulate fillers and such polymers also are provided, as are methods of providing and using such compositions.

Other aspects of the invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —CH$_2$CH$_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetra-polymers, and the like;

"random interpolymer" means an interpolymer having mer units derived from each type of constituent monomer incorporated in an essentially non-repeating manner and being substantially free of blocks, i.e., segments of three or more of the same mer;

"reactive polymer" means a polymer having at least one site which, because of the presence of an associated initiator, readily reacts with other molecules, with the term being inclusive of, inter alia, carbanionic polymers;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"substituted" means containing a heteroatom or functionality (e.g., hydrocarbyl group) that does not interfere with the intended purpose of the group or molecule in which such heteroatom or functionality is located;

"directly bonded" means covalently attached with no intervening atoms or groups;

"polyene" means a molecule, typically a monomer, with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" or "residue" means the portion of a molecule that remains after reacting with another molecule, regardless of whether any atoms are gained or lost as a result of the reaction;

"ring system" means a single ring or two or more fused rings or rings linked by a single bond, with the proviso that each ring includes unsaturation;

"terminus" means an end of a polymeric chain;

"terminally active" means a polymer with a living or pseudo-living terminus; and "terminal moiety" means a group or functionality located at a terminus.

Throughout this document, all values given in the form of percentages are weight percentages unless the surrounding text explicitly indicates a contrary intention. The relevant teachings of all patents mentioned below, are incorporated herein by reference.

DETAILED DESCRIPTION OF ILLUSTRATIVE EMBODIMENTS

As apparent from the foregoing, the polymer can be described or characterized in a variety of ways. Generally, it includes unsaturated mer units, typically units derived from one or more types of polyenes, and terminal functionality that includes three or four repeat units resulting from the ring opening of a formula Ia or Ib compound.

The polymer can be elastomeric and can include mer units that include unsaturation such as those derived from polyenes, particularly dienes and trienes (e.g., myrcene). Illustrative polyenes include $C_4$-$C_{12}$ dienes, particularly conjugated dienes such as, but not limited to, 1,3-butadiene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, 2,4-hexadiene, and the like.

Polyenes can incorporate into polymeric chains in more than one way. Especially for tire tread applications, controlling this manner of incorporation can be desirable. A polymer chain with an overall 1,2-microstructure, given as a numerical percentage based on total polyene content, of from ~10 to ~80%, optionally from ~25 to 65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be "substantially linear." For certain end use applications, however, keeping the content of 1,2-linkages even lower—e.g., to less than ~7%, less than 5%, less than 2%, or less than 1%—can be desirable.

Depending on the intended end use, one or more of the polymer chains can include pendent aromatic groups, which can be provided, for example, through incorporation of mer units derived from vinyl aromatics, particularly the $C_8$-$C_{20}$ vinyl aromatics such as styrene, α-methyl styrene, p-methyl styrene, the vinyl toluenes, the vinyl naphthalenes, and the like. When used in conjunction with one or more polyenes, mer units with pendent aromatic groups can constitute from ~1 to ~50%, from ~10 to ~45%, or from ~20 to ~35%, of the polymer chain; the microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Depending on the nature of the polymer desired, the particular conditions of the solution polymerization can vary significantly. In the discussion that follows, a description of an illustrative living (anionic) polymerization precedes a description of functionalization and processing of polymers so made.

Solution polymerization typically involves an initiator such as an organolithium compound, particularly alkyllithium compounds. Examples of organolithium initiators include N-lithio-hexamethyleneimine; n-butyllithium; tributyltin lithium; dialkylaminolithium compounds such as dimethylaminolithium, diethylaminolithium, dipropylaminolithium, dibutylaminolithium and the like; dialkylaminoalkyllithium compounds such as diethylaminopropyllithium; and those trialkyl stanyl lithium compounds involving $C_1$-$C_{12}$, preferably $C_1$-$C_4$, alkyl groups.

Multifunctional initiators, i.e., initiators capable of forming polymers with more than one living end, also can be used. Examples of multifunctional initiators include, but are not limited to, 1,4-dithiobutane, 1,10-dithiodecane, 1,20-dithioeicosane, 1,4-dithiobenzene, 1,4-dithionaphthalene, 1,10-dithioanthracene, 1,2-dithio-1,2-diphenylethane, 1,3,5-trithiopentane, 1,5,15-trithioeicosane, 1,3,5-trithiocyclohexane, 1,3,5,8-tetralithiodecane, 1,5,10,20-tetra-lithioeicosane, 1,2,4,6-tetralithiocyclohexane, and 4,4'-dithiobiphenyl.

In addition to organolithium initiators, so-called functional initiators also can be useful. These become incorporated into the polymer chain, thus providing a functional group at the initiated end of the chain. Examples of such materials include lithiated aryl thioacetals (see, e.g., U.S. Pat. No. 7,153,919) and the reaction products of organolithium compounds and, for example, N-containing organic compounds such as substituted aldimines, ketimines, secondary amines, etc., optionally pre-reacted with a compound such as diisopropenyl benzene (see, e.g., U.S. Pat. Nos. 5,153,159 and 5,567,815). Other potentially useful functional initiators include, but are not limited to, those described in U.S. Pat. Publ. Nos. 2010/0286348 and 2011/0009583 and int'l patent publ. nos. WO 2011/002830 and WO 2011/008501.

Useful anionic polymerization solvents include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased through inclusion of a coordinator, usually a polar compound, in the polymerization ingredients. Up to 90 or more equivalents of coordinator can be used per equivalent of initiator, with the amount depending on, e.g., the amount of vinyl content desired, the level of non-polyene monomer employed, the reaction temperature, and nature of the specific coordinator employed. Compounds useful as coordinators include organic compounds that include a heteroatom having a non-bonded pair of electrons (e.g., O or N). Examples include dialkyl ethers of mono- and oligo-alkylene glycols; crown ethers; tertiary amines such as tetra-methylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, di-piperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for convenience of the reader. The following is based on a batch process, although extending this description to, e.g., semi-batch or continuous processes is within the capability of the ordinarily skilled artisan.

Solution polymerization typically begins by charging a blend of monomer(s) and solvent to a suitable reaction vessel, followed by addition of a coordinator (if used) and initiator, which often are added as part of a solution or blend; alternatively, monomer(s) and coordinator can be added to the initiator. Polymerization preferably is conducted with moderate to vigorous agitation under anaerobic conditions provided by an inert protective gas such as $N_2$, Ar or He. The polymerization temperature may vary widely, although typically a temperature of from ~20° to ~90° C. is employed (with temperatures up to ~150° C. being possible); heat can be removed by external cooling and/or evaporation of the monomer or solvent. Polymerization pressure employed may vary widely, although typically a pressure of from ~0.1 to ~1 MPa is employed. The reactants can be agitated if desired. After a desired degree of conversion has been reached, the heat source (if used) can be removed and, if the reaction vessel is to be reserved solely for polymerizations, the reaction mixture can be removed to a post-polymerization vessel for functionalization and/or quenching. At this point, the reaction mixture commonly is referred to as a "polymer cement" because of its relatively high concentration of polymer.

A quenched sample of the resulting polymer typically exhibits a gum Mooney viscosity ($ML_4/100°$ C.) of from ~2 to ~150, more commonly from ~2.5 to ~125, even more commonly from ~5 to ~100, and most commonly from ~10 to ~75. Resulting polymers generally exhibit a number average molecular weight ($M_n$), as determined by GPC using polystyrene standards, of from ~50,000 to ~500,000 Daltons, although in certain embodiments the $M_n$ can range from ~75,000 to ~250,000 Daltons or even from ~90,000 to ~150,000 Daltons.

The described polymerization process advantageously results in polymer chains that possess reactive (living) terminals, which can be further reacted with one or more functionalizing agents so as to provide functionalized polymers. As described above, functionalization can enhance the interaction between the polymer and particulate fillers in rubber compounds, thereby improving the mechanical and dynamic properties of the resulting vulcanizates.

The polymer preferably is functionalized so as to include a moiety, typically directly bonded to the polymer, which includes multiple Si atoms and either O, S or N atoms. The Si atoms and/or, when present, N atoms can have H atoms directly bonded thereto. This functionalization can be accomplished by reacting a carbanionic (living) polymer with a formula Ia or Ib compound. In those formulas, $R^1$ is a hydrocarbyl group such as, for example, an aryl, (cyclo)alkyl, alkenyl, alkenaryl, aralkenyl, alkaryl, or aralkyl group, most commonly a $C_1$-$C_6$ substituent such as a $C_1$-$C_3$ alkyl group, a $C_5$-$C_6$ cycloalkyl group or a $C_6$ aryl group. The $R^1$ hydrocarbyl group can be substituted, as defined above; non-limiting examples of potentially useful substituted hydrocarbyl groups include $C_1$-$C_6$ alkoxy groups (as well as sulfur analogs) and secondary amino groups.

In both formula Ia and Ib compounds, n is 3 or 4. Accordingly, specific structures of formula Ia compounds include:

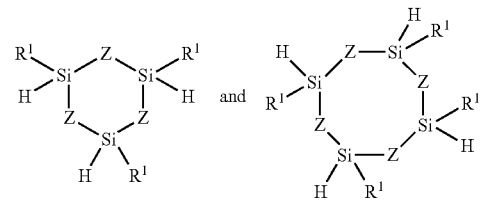

where Z is an oxygen or sulfur atom. Non-limiting examples of formula Ib compounds include those having the following structures:

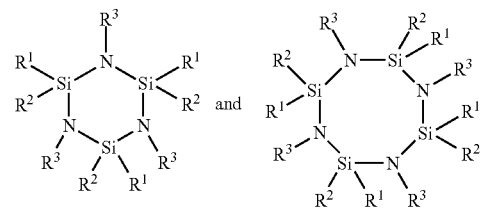

where, in each structure, one of $R^2$ and $R^3$ is H and the other is a hydrocarbyl group. In the situation where $R^3$ is H, $R^2$ also can be a substituted hydrocarbyl group of a scope similar to that set forth above in connection with $R^1$. Without wishing to be bound by theory, the required presence of the H atoms in the terminal radical is believed to enhance interactivity of the functional group with, in particular, carbon black.

Given the foregoing structures and the definitions of the variables, the ordinarily skilled artisan can envision scores of species defined by these structures.

Reaction of the foregoing types of compound with a terminally active polymer can be performed in less than ~100 minutes, often fewer than ~50 minutes, at moderate temperatures, e.g., 0° to 75° C. Reaction typically occurs between a C atom of the polymer chain and a Si atom of the cyclic silazane or hydrosiloxane. Because of the reactivity of carbanionic (living) polymers, the molar or equivalent amount of functionalizing compound need be no greater than essentially 1:1 relative to the amount of initiator employed in the polymerization. although higher ratios certainly can be employed.

Although typically not required, if desired, quenching can be conducted by stirring the polymer and an active hydrogen-containing compound, such as an alcohol or acid, for up to ~120 minutes at temperatures of from ~25° to ~150° C.

Solvent can be removed from the quenched polymer cement by conventional techniques such as drum drying, extruder drying, vacuum drying or the like, which may be combined with coagulation with water, alcohol or steam, thermal desolvation, etc.; if coagulation is performed, oven drying may be desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, NBR, silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents can have a general formula of A-T-Q, in which A represents a functional group capable of bonding physically and/or chemically with a group on the surface of the silica filler (e.g., surface silanol groups); T represents a hydrocarbon group linkage; and Q represents a functional group capable of bonding with the elastomer (e.g., via a sulfur-containing linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the Q and A functionalities mentioned above. An exemplary coupling agent is bis[3-(triethoxysilyl)propyl]-tetrasulfide.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, antidegradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

Subsequently, the compounded mixture is processed (e.g., milled) into sheets prior to being formed into any of a variety of components and then vulcanized, which typically occurs at ~5° to ~15° C. higher than the highest temperatures employed during the mixing stages, most commonly ~170° C. Vulcanizates prepared from reinforced rubber compounds of the type just described can be used for a variety of purposes including, inter alia, as an inner liners for inflated articles such as tires and sporting equipment (e.g., air filled balls).

The following non-limiting, illustrative examples provide the reader with detailed conditions and materials that can be useful in the practice of the present invention.

EXAMPLES

In the examples, dried glass vessels previously sealed with extracted septum liners and perforated crown caps under a positive $N_2$ purge were used for all preparations.

The following materials were obtained from a laboratory storeroom or synthesized: butadiene solution (in hexane), styrene solution (33.5% in hexane), hexane, n-butyllithium (1.6 M in hexane), 2,2-bis(2'-tetrahydrofuryl)propane (1.6 M solution in hexane, stored over $CaH_2$), butylated hydroxytoluene (BHT) solution in hexane, and 4-dimethylaminophenyl-1,3-dithiane (DMAPDT).

Commercially available reagents and starting materials included the following, all of which were acquired from Gelest Inc. (Morrisville, Pa.) and used without further purification unless otherwise noted in a specific example: di-t-butylchlorosilane, phenylmethyl-chlorosilane, dimethylaminoethoxysilane, methyldimethoxysilane, methyldiethoxysilane, phenyldiethoxysilane (95% purity), phenylhydrocyclosiloxanes (95% purity, "PHCS"), methylhydrocyclosiloxanes (95% purity, "MHCS"), pentamethylcyclopentasiloxane (90% purity), tetraethylcyclotetrasiloxane (95% purity, "TECTS"), 1,2,3,4,5,6-hexamethylcyclotrisilazane ("HMCTS"), 1,1,3,3,5,5-hexamethylcyclotrisilazane ("HMCTS") and 2,4,6,8-tetramethylcyclotetrasiloxane (95% purity, "TMCTS"). The following were acquired from Sigma-Aldrich Co. (St. Louis, Mo.) and used without further purification unless otherwise noted in a specific example: hexamethyleneimine ("HMI"), hexamethylcyclotrisiloxane ("HMCTSX"), and 4-(dimethylamino)benzaldehyde.

Examples 1-5

To a $N_2$-purged reactor equipped with a stirrer was added 1.66 kg hexane, 0.45 kg styrene solution, and 2.84 kg butadiene solution (21.1% by wt. in hexane). The reactor was charged with 3.81 mL n-butyllithium, followed by 1.2 mL 2,2-bis(2'-tetrahydrofuryl)propane solution. The reactor jacket was heated to 50° C. and, after ~34 minutes, the batch temperature peaked at −68° C. This control polymer is identified as sample 1 in Table 1 below.

After being charged with the same amounts of solvent and reactants, the reactor was charged 3.90 mL n-butyllithium, followed by 1.2 mL 2,2-bis(2'-tetrahydrofuryl)propane solution. The reactor jacket was heated to 50° C. and, after ~33 minutes, the batch temperature peaked at −68° C. After ~30 minutes, a 4.12 M solution of 1.6 mL TMCTS in 10 mL hexane was charged to the reactor and stirred at 50° C. for an additional ~30 minutes. Four portions of the polymer cement were dropped into dried glass bottles. One bottle (sample 2) was set aside and to the other three were added different metal tetrachlorides ($MCl_4$ with M=Si in sample 3, Ti in sample 4, and Sn in sample 5), at an initiator-to-M ratio of 3:1. Each of the bottles containing samples 2-5 was kept in a 50° C. water bath for ~30 minutes.

The five polymer cements were dropped separately into isopropanol containing BHT and then drum dried. The properties of the polymers are summarized below in Table 1 where $M_p$ represents peak molecular weight. Mooney viscosity ($ML_{1+4}$) values were determined with an Alpha Technologies™ Mooney viscometer (large rotor) using a one-minute warm-up time and a four-minute running time, with $t_{80}$ representing the relaxation time of the sample polymer it reaches 20% of its original viscosity value.

TABLE 1

Properties of polymers from Examples 1-5

|  | 1 | 2 | 3 | 4 | 5 |
|---|---|---|---|---|---|
| $M_n$ (kg/mol) | 118.7 | 144.8 | 156.8 | 165.8 | 178.2 |
| $M_w/M_n$ | 1.04 | 1.29 | 1.28 | 1.27 | 1.31 |
| $M_p$ (kg/mol) | 122.7 | 115.3 | 235.0 | 234.1 | 235.6 |
| $T_g$ (° C.) | −40.9 | −42.4 | −42.9 | −42.8 | −41.9 |
| $ML_{1+4}$ @ 100° C. | 16.0 | 41.4 | 52.1 | 55.4 | 65.6 |
| $t_{80}$ (min.) | 0.95 | 1.44 | 1.63 | 1.62 | 1.94 |
| % coupling | 1.4 | 50.1 | 56.1 | 66.5 | 68.3 |

Examples 6-9

To a $N_2$-purged reactor equipped with a stirrer was added 1.60 kg hexane, 0.45 kg styrene solution, and 2.89 kg butadiene solution (20.7% by wt. in hexane). The reactor was charged with 3.98 mL n-butyllithium, followed by 1.2 mL 2,2-bis(2'-tetrahydrofuryl)propane solution. The reactor jacket was heated to 50° C. and, after ~31 minutes, the batch temperature peaked at ~65° C.

After an additional 30 minutes at 50° C., portions of the polymer cement were dropped into dried glass bottles. One was terminated with isopropanol (designated sample 6 below), while the other three were reacted with a cyclic siloxane:

sample 7—4.8 M MHCS,
sample 8—2.3 M PHCS, and
sample 9—3.3 M TECTS.

In each of samples 7-9, cyclic siloxane was added so as to provide a 1:1 ratio of initiator-to-siloxane. Each of the bottles were kept in a 50° C. water bath for ~30 minutes.

Each of the four polymer cements was dropped separately into isopropanol containing BHT and then drum dried. The properties of the polymers are summarized below in Table 2.

TABLE 2

Properties of polymers from Examples 6-9

|  | 6 | 7 | 8 | 9 |
|---|---|---|---|---|
| $M_n$ (kg/mol) | 112.7 | 131.9 | 139.2 | 168.4 |
| $M_w/M_n$ | 1.04 | 1.17 | 1.20 | 1.19 |
| $M_p$ (kg/mol) | 116.8 | 116.9 | 117.5 | 238.2 |
| $ML_{1+4}$ @ 100° C. | 12.4 | 25.6 | 35.3 | 54.9 |
| $t_{80}$ (min.) | 0.93 | 1.14 | 1.31 | 1.42 |
| % coupling | 1.0 | 28.2 | 35.2 | 65.9 |

Examples 10-13

To a $N_2$-purged, oven dried bottle were added 1.42 g 4-dimethylaminophenyl-1,3-dithiane (DMAPDT), 10 mL dried THF and 1.0 mL triethylamine, followed by 3.9 mL of a 1.0 M solution of n-butyllithium in hexane. This functional initiator was used in these examples.

To a $N_2$-purged reactor equipped with a stirrer was added 1.66 kg hexane, 0.45 kg styrene solution, and 2.84 kg butadiene solution (21.1% by wt. in hexane). The reactor was charged with the yellow solution of functional initiator, followed by 1.0 mL 2,2-bis(2'-tetrahydrofuryl)propane solution. The reactor jacket was heated to 50° C. and, after ~25 minutes, the batch temperature peaked at ~71° C.

After an additional 30 minutes, a 4.2 M solution of 1.5 mL HMCTS in 10 mL hexane was charged; the mixture was agitated for additional ~30 minutes at 50° C. Four portions of the polymer cement were dropped into dried glass bottles. The contents of one bottle were terminated with isopropanol (sample 10) was set aside and to the other three were added different metal tetrachlorides ($MCl_4$ with M=Si in sample 11, Ti in sample 12, and Sn in sample 13), at an initiator-to-M ratio of 4:1. Each of the bottles was kept in a 50° C. water bath for ~30 minutes.

The four polymer cements were dropped separately into isopropanol containing BHT and then drum dried. The properties of the polymers are summarized below in Table 3.

TABLE 3

Properties of polymers from Examples 10-13

|  | 10 | 11 | 12 | 13 |
|---|---|---|---|---|
| $M_n$ (kg/mol) | 152.2 | 170.1 | 176.9 | 214.4 |
| $M_w/M_n$ | 1.35 | 1.33 | 1.29 | 1.76 |
| $M_p$ (kg/mol) | 122.6 | 122.8 | 250.2 | 253.3 |
| $T_g$ (° C.) | −42.7 | −41.9 | −42.5 | −42.3 |
| $ML_{1+4}$ @ 100° C. | 45.4 | 63.4 | 65.0 | 96.9 |
| $t_{80}$ (min.) | 1.65 | 2.03 | 1.94 | 7.41 |
| % coupling | 48.3 | 55.3 | 62.7 | 71.4 |

Examples 14-27

Filled Compositions and Vulcanizates

The polymers from Examples 1-5 and 10-11 were used to make filled compositions (compounds), employing the formulation shown in Table 4a (carbon black as sole particulate filler) and Table 4b (silica as sole particulate filler) where N-phenyl-N'-(1,3-dimethylbutyl)-p-phenylenediamine (6PPD) acts as an antioxidant and 2,2'-dithiobis(benzothiazole) (MBTS), N-tert-butylbenzothiazole-2-sulfenamide (TBBS) and N,N'-diphenylguanidine (DPG) act as accelerators. Black oil is an extender oil that contains a relatively low amount of polycyclic aromatic compounds.

TABLE 4a

Carbon black compound formulation

|  | Amount (phr) |
|---|---|
| Masterbatch | |
| synthesized polymer | 100 |
| carbon black (N343 type) | 50 |
| wax | 2 |
| 6PPD | 0.95 |
| stearic acid | 2 |
| black oil | 10 |
| Final | |
| sulfur | 1.5 |
| ZnO | 2.5 |
| TBBS | 0.5 |
| MBTS | 0.5 |
| DPG | 0.3 |
| TOTAL | 170.25 |

TABLE 4b

Silica compound formulation

|  | Amount (phr) |
|---|---|
| Masterbatch | |
| synthetic polymer | 80 |
| natural rubber | 20 |
| silica | 52.5 |
| wax | 2 |
| 6PPD | 0.95 |
| stearic acid | 2 |
| black oil | 10 |
| Re-mill | |
| 60% disulfide silane on carrier | 5 |
| silica | 2.5 |
| Final | |
| sulfur | 1.5 |
| ZnO | 2.5 |
| MBTS | 2 |
| TBBS | 0.7 |
| DPG | 1.4 |
| TOTAL | 183.05 |

Compounds were cured for ~15 minutes at 171° C. Results of physical testing on these compounds are shown below in Tables 5a (carbon black) and 5b (silica).

Results of physical testing on vulcanizates made from the compounds also are summarized below in Tables 5a and 5b. For the "Temp. sweep" line, the top row of data are from measurements at 0° C. while the bottom row are from measurements at 60° C.

Tensile mechanical properties were determined using the standard procedure described in ASTM-D412; Payne effect (ΔG', i.e., the difference between G' at 0.25% strain and at 14% strain) and hysteresis (tan δ) data were obtained from dynamic experiments conducted at 60° C. and 10 Hz (strain sweep) and 2% strain and 10 Hz (temperature sweep). With respect to tensile properties, $M_x$ is modulus at x % elongation, $T_b$ is tensile strength at break, and $E_b$ is percent elongation at break.

TABLE 5a

Compound and vulcanizate properties (carbon black)

| | 14 | 15 | 16 | 17 | 18 | 19 | 20 |
|---|---|---|---|---|---|---|---|
| synthetic polymer (sample no.) | 1 | 2 | 3 | 4 | 5 | 10 | 11 |
| MDR2000 @ 171° C. (final) | | | | | | | |
| ML (kg · cm) | 0.91 | 3.07 | 3.31 | 3.08 | 3.37 | 3.88 | 3.86 |
| MH (kg · cm) | 17.68 | 16.97 | 17.48 | 17.57 | 17.30 | 20.11 | 20.06 |
| $t_{90}$ (min) | 5.96 | 4.56 | 4.51 | 4.77 | 4.91 | 4.83 | 4.60 |
| $ML_{1+4}$ @ 130° C. (final) | 24.8 | 76.3 | 80.1 | 78.7 | 79.6 | 97.7 | 98.9 |
| Tensile @ 23° C. (final, unaged) | | | | | | | |
| $M_{50}$ (MPa) | 1.78 | 1.67 | 1.76 | 1.68 | 1.66 | 1.87 | 1.81 |
| $M_{300}$ (MPa) | 12.19 | 14.35 | 15.33 | 14.09 | 14.50 | 16.42 | 16.53 |
| $T_b$ (MPa) | 15.7 | 16.1 | 16.3 | 19.4 | 18.0 | 21.2 | 20.6 |
| $E_b$ (%) | 371 | 329 | 316 | 391 | 361 | 323 | 362 |
| Tensile @ 100° C. (final, unaged) | | | | | | | |
| $M_{200}$ (MPa) | 6.39 | 7.49 | 7.79 | 7.32 | 7.57 | 8.74 | 8.95 |
| $T_b$ (MPa) | 7.6 | 7.1 | 10.0 | 9.9 | 10.4 | 7.9 | 8.5 |
| $E_b$ (%) | 231 | 190 | 243 | 251 | 255 | 185 | 195 |
| Strain sweep (60° C., 10 Hz, final) | | | | | | | |
| G' @ 5% strain (MPa) | 2.868 | 2.258 | 2.367 | 2.452 | 2.414 | 2.550 | 2.529 |
| G" @ 5% strain (MPa) | 0.665 | 0.330 | 0.336 | 0.354 | 0.356 | 0.314 | 0.295 |
| tan δ @ 5% strain | 0.2317 | 0.1460 | 0.1418 | 0.1442 | 0.1476 | 0.1230 | 0.1168 |
| ΔG' (MPa) | 3.834 | 1.135 | 1.191 | 1.318 | 1.343 | 1.452 | 1.342 |
| Temp. sweep (2% strain, 10 Hz, final) | | | | | | | |
| G' (MPa) | 13.732 | 8.978 | 9.017 | 9.166 | 9.387 | 9.417 | 8.920 |
| | 5.307 | 3.878 | 3.835 | 3.895 | 3.913 | 4.397 | 4.147 |
| G" (MPa) | 4.748 | 2.916 | 3.005 | 3.120 | 3.112 | 3.044 | 2.950 |
| | 1.159 | 0.597 | 0.594 | 0.609 | 0.601 | 0.568 | 0.523 |
| tan δ | 0.3452 | 0.3243 | 0.3328 | 0.3402 | 0.3309 | 0.3228 | 0.3303 |
| | 0.2184 | 0.1538 | 0.1549 | 0.1563 | 0.1536 | 0.1292 | 0.1262 |
| Dynastat tan δ (60° C., final) | 0.2183 | 0.1436 | 0.1383 | 0.1378 | 0.1387 | 0.1168 | 0.1115 |
| Bound rubber (%) | 8.7 | 30.0 | 32.4 | 29.8 | 30.7 | 42.5 | 44.2 |
| Peak tan δ @ 2% strain, 10 Hz | 0.7816 | 0.8877 | 0.8878 | 0.8863 | 0.8773 | 0.8981 | 0.9045 |

TABLE 5b

Compound and vulcanizate properties (silica)

| | 21 | 22 | 23 | 24 | 25 | 26 | 27 |
|---|---|---|---|---|---|---|---|
| synthetic polymer (sample no.) | 1 | 2 | 3 | 4 | 5 | 10 | 11 |
| MDR2000 @ 171° C. (final) | | | | | | | |
| ML (kg · cm) | 4.04 | 4.03 | 4.17 | 4.37 | 4.55 | 5.36 | 5.20 |
| MH (kg · cm) | 28.09 | 21.27 | 21.53 | 22.99 | 22.54 | 26.02 | 25.62 |
| $t_{90}$ (min) | 10.88 | 6.42 | 7.10 | 6.97 | 7.79 | 6.77 | 6.77 |
| $ML_{1+4}$ @ 130° C. (final) | 19.1 | 30.4 | 58.0 | 60.0 | 61.0 | 84.5 | 83.5 |
| Tensile @ 23° C. (final, unaged) | | | | | | | |
| $M_{50}$ (MPa) | 1.81 | 1.55 | 1.57 | 1.60 | 1.60 | 1.82 | 1.73 |
| $M_{300}$ (MPa) | 10.48 | 12.33 | 12.15 | 12.03 | 11.58 | 13.79 | 13.48 |
| $T_b$ (MPa) | 16.1 | 18.4 | 16.9 | 13.7 | 19.5 | 15.2 | 13.7 |
| $E_b$ (%) | 419 | 398 | 380 | 326 | 436 | 321 | 302 |
| Tensile @ 100° C. (final, unaged) | | | | | | | |
| $M_{50}$ (MPa) | 1.59 | 1.50 | 1.50 | 1.56 | 1.51 | 1.83 | 1.78 |
| $M_{200}$ (MPa) | 5.54 | 6.22 | 6.14 | 6.20 | 5.94 | 7.18 | 7.16 |
| $T_b$ (MPa) | 7.8 | 7.5 | 6.9 | 6.5 | 7.4 | 6.5 | 6.0 |
| $E_b$ (%) | 269 | 229 | 218 | 203 | 236 | 184 | 171 |
| Strain sweep (60° C., 10 Hz, final) | | | | | | | |
| G' @ 5% strain (MPa) | 4.846 | 2.537 | 2.555 | 2.698 | 2.710 | 2.627 | 2.954 |
| G" @ 5% strain (MPa) | 0.726 | 0.216 | 0.222 | 0.223 | 0.242 | 0.166 | 0.182 |

TABLE 5b-continued

Compound and vulcanizate properties (silica)

|  | 21 | 22 | 23 | 24 | 25 | 26 | 27 |
|---|---|---|---|---|---|---|---|
| tan δ @ 5% strain | 0.1497 | 0.0852 | 0.0868 | 0.0826 | 0.0893 | 0.0587 | 0.0616 |
| ΔG' (MPa) | 5.547 | 0.739 | 0.744 | 0.775 | 0.864 | 0.787 | 0.940 |
| Temp. sweep (2% strain, 10 Hz, final) | | | | | | | |
| G' (MPa) | 15.649 | 7.346 | 7.604 | 7.888 | 7.889 | 8.451 | 8.100 |
| | 8.543 | 4.163 | 4.306 | 4.522 | 4.453 | 5.155 | 4.871 |
| G" (MPa) | 3.609 | 1.942 | 2.052 | 2.139 | 2.115 | 2.217 | 2.099 |
| | 0.958 | 0.335 | 0.361 | 0.381 | 0.397 | 0.334 | 0.330 |
| tan δ | 0.2305 | 0.2640 | 0.2694 | 0.2708 | 0.2679 | 0.2618 | 0.2589 |
| | 0.1121 | 0.0805 | 0.0838 | 0.0842 | 0.0892 | 0.0648 | 0.0678 |
| Dynastat tan δ (60° C., final) | 0.1104 | 0.0764 | 0.0759 | 0.0729 | 0.0799 | 0.0509 | 0.0502 |
| Bound rubber (%) | 18.8 | 71.9 | 72.9 | 65.8 | 67.5 | 70.1 | 73.6 |
| Peak tan δ @ 2% strain, 10 Hz | 0.7431 | 0.8611 | 0.8750 | 0.8539 | 0.8555 | 0.8410 | 0.8517 |

Examples 28-30

To a $N_2$-purged reactor equipped with a stirrer was added 1.71 kg hexane, 0.45 kg styrene solution, and 2.79 kg butadiene solution (21.5% by wt. in hexane). The reactor was charged with 3.90 mL n-butyllithium, followed by 1.2 mL 2,2-bis(2'-tetrahydrofuryl)propane solution. The reactor jacket was heated to 50° C. and, after ~31 minutes, the batch temperature peaked at ~66° C.

After an additional 30 minutes, portions of the polymer cement were dropped into dried glass bottles. One was terminated with isopropanol (designated sample 28 below), while the other two were reacted with 1.0 M (in hexane) solutions of:

sample 29—HMCTS, and sample 30—HMCTSX (comparative).

For sample 29, HMCTS was added so as to provide a 1:1 ratio of initiator-to-silazane. Each of the bottles were kept in a 50° C. water bath for ~30 minutes.

Each of the three polymer cements was dropped separately into isopropanol containing BHT and then drum dried. The properties of the polymers are summarized below in Table 6.

TABLE 6

Properties of polymers from Examples 28-30

|  | 28 | 29 | 30 |
|---|---|---|---|
| $M_n$ (kg/mol) | 106.7 | 133.4 | 109.9 |
| $M_w/M_n$ | 1.04 | 1.19 | 1.08 |
| $M_p$ (kg/mol) | 113.0 | 115.2 | 120.0 |
| $T_g$ (° C.) | −42.3 | −42.1 | −42.3 |
| % coupling | 0.42 | 36.04 | 1.52 |

Example 31

To a $N_2$-purged reactor equipped with a stirrer was added 1.71 kg hexane, 0.45 kg styrene solution, and 2.79 kg butadiene solution (21.5% by wt. in hexane). The reactor was charged with 1.97 mL of 3.0 M HMI solution (in hexane) and 3.90 mL n-butyllithium, followed by 1.2 mL 2,2-bis(2'-tetrahydrofuryl)propane solution. The reactor jacket was heated to 50° C. and, after ~33 minutes, the batch temperature peaked at ~65° C.

After an additional 30 minutes, a 4.2 M solution of 1.5 mL HMCTS in 10 mL hexane was added to the polymer cement, which then was agitated for an additional 30 minutes at 50° C.

The polymer cement was dropped into isopropanol containing BHT and then drum dried. The properties of the polymers are summarized below in Table 7.

Example 32

To a $N_2$-purged reactor equipped with a stirrer was added 1.71 kg hexane, 0.45 kg styrene solution, and 2.79 kg butadiene solution (21.5% by wt. in hexane). The reactor was charged with the same functional initiator used above in connection with Examples 10-13, followed by 1.0 mL 2,2-bis(2'-tetrahydrofuryl)propane solution. The reactor jacket was heated to 50° C. and, after ~24 minutes, the batch temperature peaked at ~72° C.

After an additional 30 minutes, the same solution of HMCTS used in Example 31 was added to the polymer cement, which then was agitated for an additional 30 minutes at 50° C.

The polymer cement was dropped into isopropanol containing BHT and then drum dried. The properties of the polymers are summarized below in Table 7.

TABLE 7

Properties of polymers from Examples 31 & 32

|  | 31 | 32 |
|---|---|---|
| $M_n$ (kg/mol) | 130.4 | 146.7 |
| $M_w/M_n$ | 1.26 | 1.31 |
| $M_p$ (kg/mol) | 106.8 | 126.1 |
| $T_g$ (° C.) | −41.6 | −39.7 |
| % coupling | 41.2 | 35.1 |

Examples 33-40

Filled Compositions and Vulcanizates

The polymers from Examples 28-29 and 31-32 were used to make filled compositions (compounds), employing the formulations shown above in Table 4a (carbon black) and Table 4b (silica).

Results of physical testing on these compounds and vulcanizates made therefrom are shown below in Tables 8a (carbon black) and 8b (silica), with the formatting being similar to that used in connection with Tables 5a and 5b above.

TABLE 8a

Compound and vulcanizate properties (carbon black)

| | 33 | 34 | 35 | 36 |
|---|---|---|---|---|
| synthetic polymer (sample no.) | 28 | 29 | 31 | 32 |
| MDR2000 @ 171° C. (final) | | | | |
| ML (kg·cm) | 0.84 | 1.67 | 2.60 | 1.93 |
| MH (kg·cm) | 17.44 | 16.66 | 17.08 | 19.23 |
| $t_{90}$ (min) | 7.05 | 4.68 | 4.22 | 5.17 |
| $ML_{1+4}$ @ 130° C. (final) | 21.5 | 46.0 | 82.4 | 54.2 |
| Tensile @ 23° C. (final, unaged) | | | | |
| $M_{50}$ (MPa) | 1.87 | 1.84 | 1.90 | 1.94 |
| $M_{300}$ (MPa) | 12.62 | 14.67 | 17.40 | 16.77 |
| $T_b$ (MPa) | 15.1 | 13.8 | 16.8 | 14.3 |
| $E_b$ (%) | 347 | 288 | 281 | 267 |
| Tensile @ 100° C. (final, unaged) | | | | |
| $M_{50}$ (MPa) | 1.44 | 1.52 | 1.65 | 1.75 |
| $M_{100}$ (MPa) | 2.72 | 3.02 | 3.33 | 3.44 |
| $T_b$ (MPa) | 5.6 | 8.4 | 7.0 | 8.2 |
| $E_b$ (%) | 180 | 217 | 167 | 191 |
| Strain sweep (60° C., 10 Hz, final) | | | | |
| G' @ 5% strain (MPa) | 3.017 | 2.491 | 2.247 | 2.595 |
| G" @ 5% strain (MPa) | 0.685 | 0.455 | 0.260 | 0.354 |
| tan δ @ 5% strain | 0.2272 | 0.1828 | 0.1156 | 0.1363 |
| ΔG' (MPa) | 3.837 | 1.827 | 0.786 | 2.106 |
| Temp. sweep (2% strain, 10 Hz, final) | | | | |
| G' (MPa) | 18.404 | 17.982 | 16.958 | 13.243 |
| | 6.454 | 5.952 | 6.497 | 5.355 |
| G" (MPa) | 7.609 | 8.084 | 6.148 | 5.068 |
| | 1.387 | 1.357 | 1.307 | 0.925 |
| tan δ | 0.4124 | 0.4484 | 0.3618 | 0.3821 |
| | 0.2149 | 0.2279 | 0.2012 | 0.1730 |
| Dynastat tan δ (60° C., final) | 0.2262 | 0.1668 | 0.1130 | 0.1276 |
| Bound rubber (%) | 5.0 | 23.6 | 51.9 | 29.2 |
| Peak tan δ @ 2% strain, 10 Hz | 0.7767 | 0.8341 | 0.8992 | 0.8662 |

TABLE 8b

Compound and vulcanizate properties (silica)

| | 37 | 38 | 39 | 40 |
|---|---|---|---|---|
| synthetic polymer (sample no.) | 28 | 29 | 31 | 32 |
| MDR2000 @ 171° C. (final) | | | | |
| ML (kg·cm) | 1.68 | 1.69 | 2.23 | 2.87 |
| MH (kg·cm) | 20.95 | 18.94 | 20.16 | 23.85 |
| $t_{90}$ (min) | 6.90 | 5.57 | 7.59 | 7.55 |
| $ML_{1+4}$ @ 130° C. (final) | 13.8 | 27.9 | 33.1 | 47.1 |
| Tensile @ 23° C. (final, unaged) | | | | |
| $M_{50}$ (MPa) | 2.05 | 1.78 | 2.04 | 2.02 |
| $M_{200}$ (MPa) | 7.54 | 8.35 | 9.02 | 9.13 |
| $T_b$ (MPa) | 10.8 | 13.5 | 14.0 | 12.9 |
| $E_b$ (%) | 267 | 279 | 274 | 256 |
| Tensile @ 100° C. (final, unaged) | | | | |
| $M_{50}$ (MPa) | 1.84 | 1.71 | 1.98 | 1.98 |
| $M_{100}$ (MPa) | 3.33 | 3.31 | 3.75 | 3.73 |

TABLE 8b-continued

Compound and vulcanizate properties (silica)

| | 37 | 38 | 39 | 40 |
|---|---|---|---|---|
| $T_b$ (MPa) | 5.7 | 7.0 | 7.2 | 6.8 |
| $E_b$ (%) | 168 | 182 | 173 | 166 |
| Strain sweep (60° C., 10 Hz, final) | | | | |
| G' @ 5% strain (MPa) | 4.260 | 2.343 | 2.818 | 3.065 |
| G" @ 5% strain (MPa) | 0.679 | 0.244 | 0.250 | 0.260 |
| tan δ @ 5% strain | 0.1593 | 0.1042 | 0.0886 | 0.0847 |
| ΔG' (MPa) | 4.739 | 0.854 | 1.140 | 1.465 |
| Temp. sweep (2% strain, 10 Hz, final) | | | | |
| G' (MPa) | 18.235 | 33.078 | 10.182 | 10.394 |
| | 6.259 | 16.882 | 5.384 | 5.610 |
| G" (MPa) | 8.170 | 8.191 | 3.061 | 3.094 |
| | 1.221 | 1.359 | 0.534 | 0.476 |
| tan δ | 0.4468 | 0.2476 | 0.3005 | 0.2975 |
| | 0.1950 | 0.0805 | 0.0991 | 0.0847 |
| Dynastat tan δ (60° C., final) | 0.1270 | 0.0919 | 0.0751 | 0.0704 |
| Peak tan δ @ 2% strain, 10 Hz | 0.7656 | 0.7605 | 0.7934 | 0.8169 |

That which is claimed is:

1. A method for providing a polymer having terminal functionality that comprises multiple repeating units in which a silicon atom is bonded to an oxygen or sulfur atom, said method comprising reacting a terminally active polymer with a cyclic compound having a general formula selected from

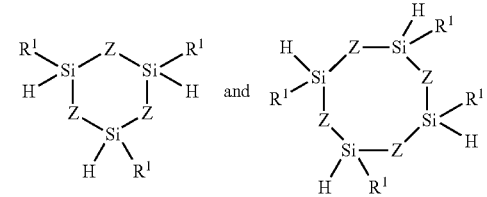

Z is an O or S atom and each $R^1$ independently is a $C_1$-$C_6$ hydrocarbyl group, at least one of said $C_1$-$C_6$ hydrocarbyl groups being substituted.

2. The method of claim 1 wherein each $R^1$ independently is a $C_1$-$C_3$ alkyl group, a $C_5$-$C_6$ cycloalkyl group or a $C_6$ aryl group.

3. The method of claim 1 wherein said substituted $C_1$-$C_6$ hydrocarbyl group is an alkoxy group.

4. The method of claim 1 wherein said terminally active polymer comprises polyene mer.

5. The method of claim 4 wherein said terminally active polymer further comprises mer that comprises a pendent aromatic group.

6. The method of claim 5 wherein said terminally active polymer has random microstructure.

7. A method for providing a polymer having terminal functionality that comprises multiple repeating units in which a silicon atom is bonded to a nitrogen atom, said method comprising reacting a terminally active polymer that comprises polyene mer and mer that comprises a pendent aromatic group, said polymer optionally having random microstructure, with a cyclic compound having the general formula

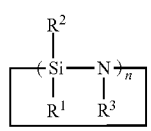

where n is 3 or 4, $R^1$ is a substituted or unsubstituted hydrocarbyl group, and one of $R^2$ and $R^3$ is a hydrogen atom and the other is a hydrocarbyl group with the proviso that, where $R^3$ is H, $R^2$ also can be a substituted hydrocarbyl group.

8. The method of claim 7 wherein said cyclic compound is selected from

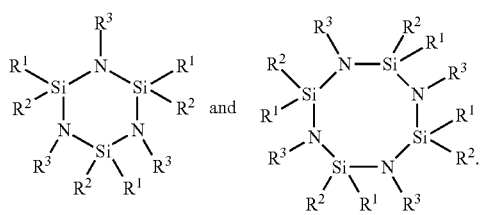

9. The method of claim 8 wherein each $R^1$ independently is an aryl, alkyl, cycloalkyl, alkenyl, alkenaryl, aralkenyl, alkaryl, or aralkyl group.

10. The method of claim 8 wherein each $R^1$ independently is a $C_1$-$C_6$ hydrocarbyl group.

11. The method of claim 10 wherein each $R^1$ independently is a $C_1$-$C_3$ alkyl group, a $C_5$-$C_6$ cycloalkyl group or a $C_6$ aryl group.

12. The method of claim 10 wherein at least one of said $C_1$-$C_6$ hydrocarbyl groups is substituted.

13. The method of claim 7 where each $R^3$ is H and each $R^2$ is a substituted hydrocarbyl group.

14. The method of claim 13 wherein each $R^2$ is a $C_1$-$C_6$ alkoxy group.

15. A process for providing a polymer having terminal functionality that comprises multiple repeating units in which a silicon atom is bonded to an oxygen or sulfur atom, said method comprising reacting (1) a terminally active polymer that comprises polyene mer and mer that comprises a pendent aromatic group, said polymer optionally having random microstructure, with (2) a cyclic compound having the general formula

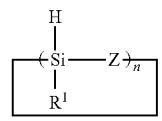

where n is 3 or 4, Z is an O or S atom, and each $R^1$ is a substituted or unsubstituted hydrocarbyl group, thereby providing said polymer having terminal functionality.

16. The process of claim 15 wherein said cyclic compound is selected from

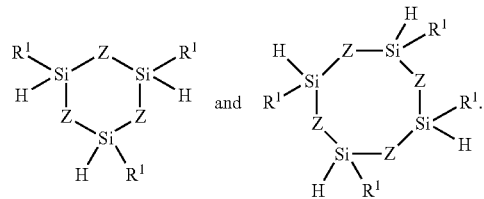

17. The process of claim 16 wherein each $R^1$ independently is an aryl, alkyl, cycloalkyl, alkenyl, alkenaryl, aralkenyl, alkaryl, or aralkyl group.

18. The process of claim 16 wherein each $R^1$ independently is a $C_1$-$C_6$ hydrocarbyl group.

19. The process of claim 18 wherein each $R^1$ independently is a $C_1$-$C_3$ alkyl group, a $C_5$-$C_6$ cycloalkyl group or a $C_6$ aryl group.

20. The process of claim 15 wherein said polymer has an overall 1,2-microstructure, based on total polyene content, of from 25 to 65%.

* * * * *